J. G. UTZ.
VEHICLE SPRING.
APPLICATION FILED APR. 13, 1914.
1,153,357.
Patented Sept. 14, 1915.
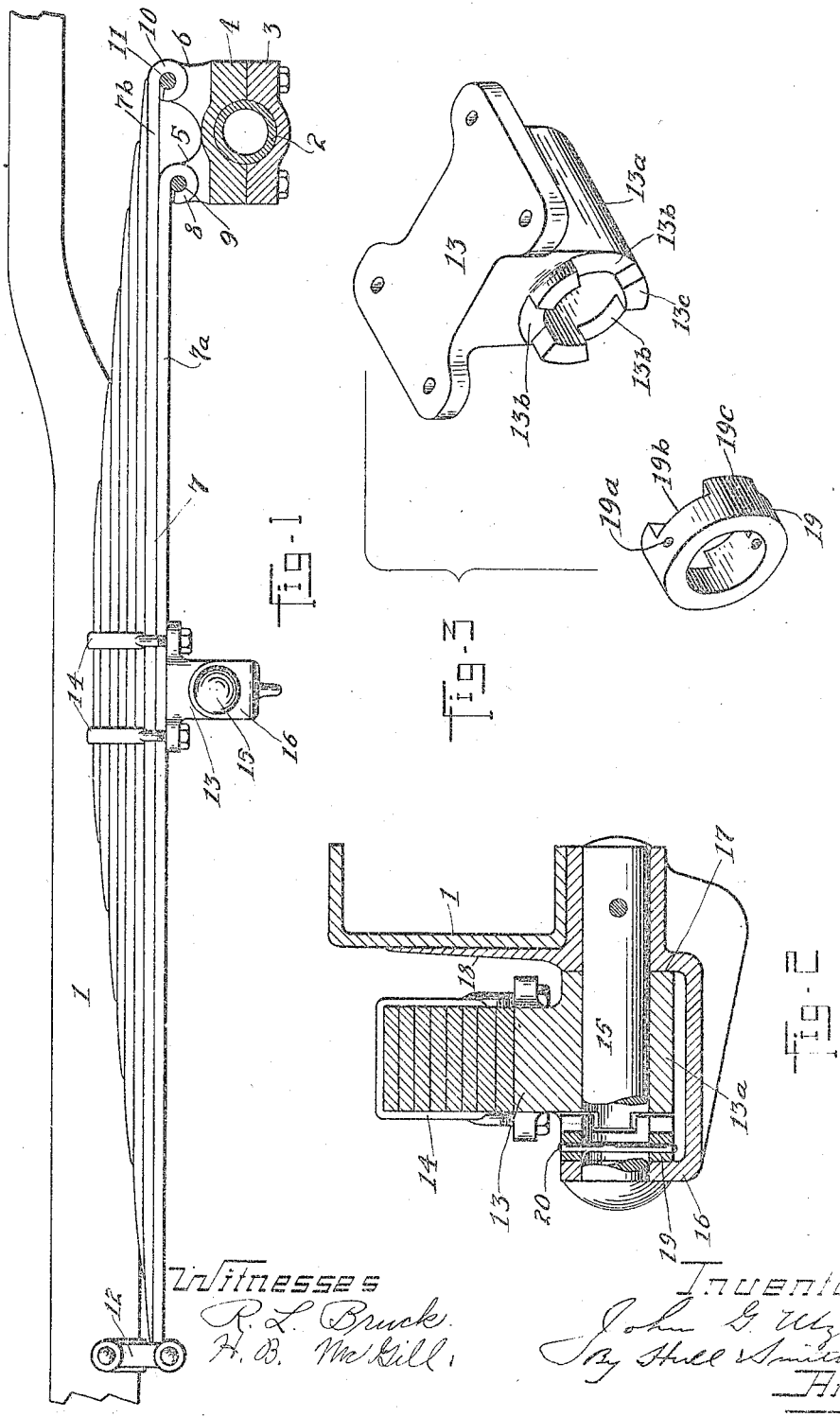

UNITED STATES PATENT OFFICE.

JOHN G. UTZ, OF CLEVELAND, OHIO, ASSIGNOR TO THE PERFECTION SPRING COMPANY, OF CLEVELAND, OHIO, A CORPORATION OF OHIO.

VEHICLE-SPRING.

1,153,357.            Specification of Letters Patent.     Patented Sept. 14, 1915.

Application filed April 13, 1914. Serial No. 831,410.

*To all whom it may concern:*

Be it known that I, JOHN G. UTZ, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and, while certain features of construction may be of more general application, the embodiment hereof is designed with particular reference to the type of spring known to the art as "cantaliver" springs.

It is the general purpose of this invention to provide such a spring with means whereby unnecessary vibration thereof, involving unnecessary relative movement between the vehicle frame or body and the axle, may be prevented without sacrificing the resiliency of the spring within predetermined practical working limits. In this particular embodiment, I accomplish this result by the construction illustrated in the drawings, wherein—

Figure 1 represents a side elevation of a part of the side frame of an automobile, showing connected thereto a spring made in accordance with my invention, the axle being shown in section; Fig. 2 represents an enlarged sectional detail through the bracket to which the central portion of the spring is pivotally connected; and Fig. 3 a detail in perspective of the two parts of the device whereby the rotation of the spring with reference to the bracket pivot is limited.

Describing by reference characters the various parts illustrated herein, 1 denotes a part of the side or body frame of a vehicle, such as an automobile, and 2 the axle. 3 denotes the lower and 4 the upper member of a spring seat which is rotatably mounted upon the axle. The upper member is provided with two pairs of upwardly projecting lugs 5 and 6, which pairs of lugs are spaced apart in the direction of the length of the spring, the lugs 6 being sufficiently longer than the lugs 5 to permit the main leaf of the spring and the leaf next thereto to be connected to the lugs 5 and 6 respectively without altering the normal relation between the leaves.

7 denotes a spring of the cantaliver type, the main plate 7ª whereof is provided with an eye 8 which is connected to the lugs 5 by means of a pin 9.

7ᵇ denotes the plate next adjacent to the main plate 7ª, the plate 7ᵇ being provided with an eye 10 which is connected to the lug 6 by means of a pin 11. The opposite end of the spring from that just described is connected to the frame 1 by means of depending shackles or links 12, while the central portion of the spring is pivotally connected to the frame by means of a spring seat 13 to which it is secured by the clips 14, the spring seat being pivotally mounted upon a pin or bolt 15 extending across the arms 16 and 17 of a U-shaped yoke forming part of a bracket, indicated generally at 18, which is secured to the side frame 1.

The construction thus far described is substantially the same as that illustrated and described in the application of Michael M. McIntyre for vehicle springs, filed April 1, 1914, Serial No. 828,694.

The spring seat 13 is provided with a cylindrical sleeve 13ª by which it is rotatably mounted upon the pin or bolt 15. One end of this sleeve is provided with segmental recesses 13ᵇ, three such recesses being shown, said recesses being separated by segmental projections 13ᶜ. The recesses are of greater angular extent than are the projections, for a reason to be explained hereinafter.

19 denotes a short cylindrical sleeve which is nonrotatably supported in a position to coöperate with the recessed end of the sleeve 13ª. The sleeve 19 may be conveniently secured in place by means of a pin 20, extending through the pin or bolt 15, the said sleeve being interposed between the sleeve 13ª and the arm 16 of the bracket yoke. The end of the sleeve 19 which faces the sleeve 13ª is provided with segmental recesses 19ᵇ and interposed segmental projections 19ᶜ. The recesses 19ᵇ and the projections 19ᶜ are preferably of the same angular extent as the recesses 13ᵇ and projections 13ᶜ, respectively, and the parts will be so arranged that, when assembled, the projections of the sleeve 13ª will be within the recesses 19^b while the projections 19^c will be within the recesses 13^b, the construction affording a pin-and-slot connection between the sleeves. The parts will also be so arranged that, under normal conditions of load, the projections on one sleeve will occupy the central portions of the recesses of the other sleeve.

From the foregoing description it is believed that the operation will be clear. Under ordinary conditions, the action of the spring will be substantially the same as that of a cantaliver spring such as shown herein but having the ordinary connection with the bracket 18. In the case of excessive vibration of the end of the spring which is connected to the axle, it will be evident that the rotary movements of the spring about the pin or bolt 15 will be positively stopped by the engagement of the shoulders on the projections 19^c and 13^c and that this positive stop will occur when the axle shall have moved a predetermined distance either upwardly or downwardly, or when the vehicle body shall have moved a predetermined distance upwardly or downwardly with reference to the axle. The result is that the spring will operate in the ordinary manner until this point of maximum deflection is reached, whereupon only the part of the spring extending between the axle and the bracket 18 will be active. This obviously will operate to check the excessive vibration of the spring and the excessive relative movement between the vehicle body and the axle.

By merely proportioning the relative lengths of the recesses and projections on the sleeves 13^a and 19, the full resilient action of the spring may be retained throughout a predetermined desirable range of movement and, within this predetermined limit, the full efficiency of the spring is available for the purpose of easy riding. When, however, the relative movement between the vehicle and the body becomes excessive, this movement is checked through the automatic substitution of a short spring for a long one, whereby this excessive movement is reduced in extent, but without sacrificing any of the resiliency of the spring within the limits which are desirable.

Having thus described my invention, what I claim is:—

1. The combination, with a vehicle body frame and axle, of a spring connected at one end to the axle and at its opposite end to the frame, means pivotally connecting the central portion of the spring to the frame, and means for limiting the rotary movement of the spring about such pivot.

2. The combination, with a vehicle body frame and axle, of a spring connected at one end to the axle and at the other end to the frame, means pivotally connecting the central portion of the spring to the frame, and means coöperating with such pivotal connection for positively limiting the rotary movement of the spring about its pivot in both directions.

3. The combination, with a vehicle body frame and axle, of a spring, means connecting one end of said spring to the axle, means connecting the opposite end of the spring to the said frame, a pivotal connection between the central portion of the spring and the frame, said connection including a bracket having a pin, a spring seat rotatably mounted on the pin, and means associated with the spring seat and the pin whereby the rotary movement of the seat with reference to the pin is limited.

4. The combination, with a vehicle body frame and axle, of a spring, means connecting one end of said spring to the axle, means connecting the opposite end of the spring to the said frame, a pivotal connection between the central portion of the spring and the frame, and means associated with such connection whereby the rotary movement of the spring is limited in both directions from its normal position.

5. The combination, with a vehicle body frame and axle, of a spring, means connecting one end of the spring to the axle, means connecting the opposite end of the spring to the frame, a spring seat connected to the central portion of the spring, a support carried by the frame on which said seat is rotatably mounted, said seat having one end thereof provided with one or more segmental recesses, and a member carried by the pin having one or more projections adapted to enter said recess or recesses, each projection being of less angular extent than its coöperating recess.

6. The combination, with a vehicle body frame and axle, of a spring, means connecting one end of the spring to the axle, means connecting the opposite end of the spring to the frame, a support carried by the frame on which the central portion of the spring is rotatably mounted, the spring and the support being provided the one with a recess and the other with a projection entering such recess and of less angular extent than the recess whereby the rotary movement of the spring with reference to its support is limited.

7. The combination, with a vehicle body and axle, of a spring, means connecting one end of the spring to the axle, means connecting the opposite end of the spring to the frame, a bracket carried by the frame, a pin supported in said bracket, a spring seat connected to the spring and having a sleeve member rotatably mounted on the pin, a second sleeve member which is fixed to the pin with reference to the first sleeve member, said sleeve members being provided the one with a recess and the other with a projection adapted to enter the recess and
5. being of less angular extent than said recess, whereby the rotary movement of the spring about said pin is limited.

In testimony whereof, I hereunto affix my signature in the presence of two witnesses.

JOHN G. UTZ.

Witnesses:
  J. B. HULL,
  BRENNAN B. WEST.